United States Patent

Auger et al.

[11] Patent Number: 6,130,678
[45] Date of Patent: Oct. 10, 2000

[54] DISPLAY SYSTEM WITH LINE SMOOTHING USING PIXEL MICRO-ZONES AND COMPUTATION CELLS ALLOWING A REDUCED NUMBER OF ACCESSES TO IMAGE MEMORY WITH SIMPLIFIED ADDRESSING

[75] Inventors: Dominique Auger, Le Haillan; Louis Montestrucq, Saint Cloud; Olivier Pernia, Lormont; Miguel Urquia, Saint Jean d'Illac, all of France

[73] Assignee: Sextant Avionique, Velizy Villacoublay, France

[21] Appl. No.: 08/770,722

[22] Filed: Dec. 19, 1996

[30] Foreign Application Priority Data

Dec. 21, 1995 [FR] France ................................ 95 15261

[51] Int. Cl.[7] ........................................................ G06T 11/00
[52] U.S. Cl. ............................ 345/443; 345/136; 345/149
[58] Field of Search .................................... 345/443, 136, 345/149; 382/205, 266, 269, 258

[56] References Cited

U.S. PATENT DOCUMENTS

| 4,010,446 | 3/1977 | Kawa | 382/258 |
|---|---|---|---|
| 4,771,471 | 9/1988 | Kitamura | 382/269 |
| 5,016,193 | 5/1991 | Stone et al. | 345/428 |
| 5,134,503 | 7/1992 | Kimura | 358/447 |
| 5,150,105 | 9/1992 | Perbet et al. | 345/147 |
| 5,287,451 | 2/1994 | Favot et al. | 345/517 |
| 5,790,128 | 8/1998 | Filliatre et al. | 345/421 |

*Primary Examiner*—Mark K. Zimmerman
*Assistant Examiner*—Albert K. Lee
*Attorney, Agent, or Firm*—Oblon, Spivak, McClelland, Maier & Neustadt, P.C.

[57] ABSTRACT

A method and system for generating symbols in real time on a display screen. The method and system can be applied to generating symbols for assisting in aircraft piloting and navigation. For the plotted lines generated on a matrix screen such as a liquid crystal display screen, the visual appearance deteriorates since the eye is sensitive to the steps produced by the matrix array. To improve the appearance, the plotted lines are widened and they are modulated in luminosity and in color. This is done by replacing each point of a theoretical plotted line by a micro-zone of N×M points modulated in intensity according to a table of instructed-value coefficients. Coefficients are computed for each point of the widened plotted line on the basis of this table and on the basis of coefficients previously computed for the same points. Rather than recording the computed points in the memory at each time and reading them again in subsequent computations, only the definitively processed points are transmitted to the image memory.

10 Claims, 6 Drawing Sheets

| X 10 HIGHER-ORDER BITS | Y 10 HIGHER-ORDER BITS | THE SHIFTING OF THE PLOTTED LINE | TRANSMISSION TO THE IMAGE MEMORY | FIRST SHIFT | S0a | S1a | SHIFT | SECOND SHIFT | S0b | S1b | SHIFT |
|---|---|---|---|---|---|---|---|---|---|---|---|
| X' | Y' | SAME SCREEN POINT | NONE | NONE | — | — | 0 | NONE | — | — | 0 |
| X'+1 | Y' | RIGHT-HAND | LEFT-HAND COLUMN | LEFT-HAND | 0 | 0 | 1 | NONE | — | — | 0 |
| X'−1 | Y' | LEFT-HAND | RIGHT-HAND COLUMN | RIGHT-HAND | 1 | 0 | 1 | NONE | — | — | 0 |
| X' | Y'+1 | TOP | BOTTOM ROW | BOTTOM | 0 | 1 | 1 | NONE | — | — | 0 |
| X' | Y'−1 | BOTTOM | TOP ROW | TOP | 1 | 1 | 1 | NONE | — | — | 0 |
| X'+1 | Y'+1 | TOP / RIGHT-HAND DIAGONAL | LEFT-HAND COLUMN AND BOTTOM ROW | LEFT-HAND | 0 | 0 | 1 | BOTTOM | 0 | 1 | 1 |
| X'+1 | Y'−1 | BOTTOM / RIGHT-HAND DIAGONAL | LEFT-HAND COLUMN AND TOP ROW | LEFT-HAND | 0 | 0 | 1 | TOP | 1 | 1 | 1 |
| X'−1 | Y'+1 | TOP / LEFT-HAND DIAGONAL | RIGHT-HAND COLUMN AND BOTTOM ROW | RIGHT-HAND | 1 | 0 | 1 | BOTTOM | 0 | 1 | 1 |
| X'−1 | Y'−1 | BOTTOM / LEFT-HAND DIAGONAL | RIGHT-HAND COLUMN AND TOP ROW | RIGHT-HAND | 1 | 0 | 1 | TOP | 1 | 1 | 1 |

FIG.6

DISPLAY SYSTEM WITH LINE SMOOTHING USING PIXEL MICRO-ZONES AND COMPUTATION CELLS ALLOWING A REDUCED NUMBER OF ACCESSES TO IMAGE MEMORY WITH SIMPLIFIED ADDRESSING

BACKGROUND OF THE INVENTION

1. Field of the Invention

The invention pertains to the generation of symbols in real time on a display screen. The typical application that can be made thereof is the generation of symbols for assistance in air piloting and navigation (e.g., the display of an earth-sky representation with a rotating horizon and an indication of the attitude of the aircraft, the display of a flight plan, a heading dial or card, scrolling altimetrical scales, speed, and various alphanumerical information). These symbols are generated using a symbol generator. The symbol generator is a computer that receives information elements that are needed as a function of the display to be made. For example, information from sensors distributed in the aircraft is used to produce coordinates of successive points of a (colored) trace or plotted line and is displayed on the screen. These coordinates and colors are placed in an image memory. The image memory is read to generate point-by-point information for the control of the display screen so that the desired image appears.

2. Description of the Background

Based on space constraints, there is a trend towards the replacement of cathode-ray tube displays by flat-screen screens, especially liquid-crystal screens. These screens are matrix type screens with corresponding problems. The matrix screens tend to reproduce notched lines and adversely affect the observer's viewing comfort, as the eye is particularly sensitive to sudden transitions in the plotted line from one point to another on the screen.

Accordingly, attempts have been made to smooth plotted lines. This smoothing operation essentially includes plotting relatively thick lines, each line having a width of several rows or of columns around the theoretical line to be plotted, with a distribution of luminance within the line, namely the central part of the line is brighter than the edges of the line. This smoothing operation considerably reduces the unpleasant impression caused by the matrix nature of the screen.

The French patent 87 12039, dated Aug. 28, 1987, and the French patent 90 10587, dated Aug. 23, 1990 define the basic features of this smoothing operation, including replacing each point of the theoretical plotted line by a micro-zone of N×M points around the theoretical point and supplying, to the image memory, the luminance values and color values (generally known as the "coefficient of membership in the plotted line") for all the points of a widened plotted line resulting from the succession of the micro-zones along the theoretical single-pixel width plotted line.

FIG. 1a shows a theoretical single-pixel width plotted line including a succession of points Pt1, Pt2, etc. FIG. 1b shows a widened plotted line resulting from the replacement of each point Pt of the single-pixel width plotted line by a micro-zone of 4 points by 4 points, namely a 16-point matrix centered on the point Pt as shown. FIG. 1c shows (1) a micro-zone, now assigned a modulation of luminosity (represented by a variable hatching density) and (2) the smoothed plotted line that results from this modulation of luminosity applied to the micro-zones.

However, this smoothing implies substantial computing capacity: the symbol generator should provide plotted lines computed at a fast rate so that the images are refreshed permanently as a function of the changes undergone by the data elements to be displayed. High-speed computation circuits need to be interposed between the symbol generator and the image memory and for each new point of the plotted line given by the generator, the luminance values (and possibly the color values) of the surrounding points need to be recomputed even if they have already been computed during the plotting of the previous point. These luminance values need to be recomputed when taking into account the values previously stored in the image memory. This results from the overlapping of the micro-zones with respect to one another. There is a correlation to be made between the successive computations performed for one and the same point of the screen. This means that it is necessary to access the image memory with a far greater frequency than would be the case if only one point on the plotted line were displayed. Now, there are physical limits to the possibilities of addressing large-capacity memories (such as an image memory) in read and write mode.

This is why the French patent 90 10587 has proposed a special architecture using as many different memories, addressed in parallel, as there are points (N×M) in the micro-zones, in order to make it possible to read and write the totality of a micro-zone in a single step.

This approach may be satisfactory if the size N×M of the micro-zone is not too great. However, once this size increases, it becomes impossible to make the smoothing computation circuit in the form of an integrated circuit for it must comprise an extremely large number of inputs/outputs for the addressing of the image memory. It is hardly possible to make 4 point by 4 point micro-zone with a single smoothing integrated circuit for an image with 1024 by 1024 points.

Using micro-zones with larger sizes (e.g., 6×6 and even up to 12×12) is important since:

(1) it may be useful to represent particularly thick plotted lines for certain symbols without the symbol generator being required to plot several lines in parallel, which would slow down its operation;

(2) certain types of smoothing of plotted lines require a greater micro-zone width than others, as a function of the nature of the contrast desired between the color of the line and the color of the background; and (3) wider micro-zones enable lines to be plotted with a variable width. It is possible to set the peripheral coefficients of the micro-zone to zero to plot lines of smaller width. This is important because experience shows that colored lines must be plotted wider than white lines.

SUMMARY OF THE INVENTION

The present invention provides both a new method for image processing and a new architecture for a system for (1) displaying symbolic images and (2) smoothing plotted lines using large-sized micro-zones with a more efficient compromise between the number of memory accesses and the number of connections necessary to access the image memory.

The present invention includes a display system comprising a generator of symbols to be displayed, a plotted line smoothing circuit and an image memory. The symbol generator provides coordinates of successive points of a plotted line. The smoothing circuit computes coefficients of membership in the plotted line for a group G of N×M points surrounding a point with coordinates X, Y after having computed the coefficients of membership in the plotted line for another group G' of N×M points surrounding a point with coordinates X', Y' previously given by the symbol generator. The smoothing circuit comprises:

means for the sending, to the image memory, the coefficients of membership in the plotted line solely for the points of the group G' that do not belong to the group G, as a function of the vector connecting the point X', Y' to the point X, Y, means for computing the coefficients of membership of the points of the group G based on the coefficients previously computed for the points common to the groups G and G', and means for the preserving, in a memory of N×M cells, with a view to a forthcoming computation, the coefficients of membership computed for the points of the group G.

A more detailed explanation of the phrase "coefficient of membership in the plotted line" is provided below. However, the phrase encompasses plotting a white line on a black background, by thickening the width of a micro-zone. Where the coefficient is a value of relatively luminosity that is high for a point of the micro-zone located towards the center of the plotted line and gradually diminishes for the points located close to the edge of the plotted line. It will be understood that this coefficient is expressed in a more complex way for colored examples (e.g., a line of one color on a background of another color, and a line of one color outlined by a black border on a background of another color or almost of the same color).

The smoothing circuit preferably includes (1) an array of N×M computation and storage cells connected to one another that work as a right/left, left/right, top/bottom and bottom/top shift register and (2) a control circuit capable of defining shifts to be performed simultaneously for all the cells. The register is in the form of a ring, both horizontally (with the outputs of the cells of the far left end of the array being connected to the inputs of the cells of the far right end of the array and vice versa), and vertically (with the cells of the bottom end being connected to those of the top end and vice versa).

From the symbol generator, the control circuit receives the coordinates X, Y of a point of the plotted line and stores the coordinates of the previous point to set up shift signals as a function of the shift vector (X–X', Y–Y').

The control circuit controls sending, to the image memory, the coefficients computed by the cells of an end row or an end column, or of an end row and an end column of the array, as a function of the shift vector. It is also capable of clearing or erasing the contents of these cells.

Each cell has multiplexing means to receive either a coefficient coming from a table selected by the control circuit or the output of a neighboring cell selected by the control circuit. The control circuit asserts (1) control signals for the shifting of the cells and (2) a signal to permit comparison between a coefficient contained in a cell and a coefficient given by a table.

An object of the invention is to provide (1) a new system for the display of plotted lines and (2) a new method for processing plotted lines to be displayed on a display screen based on a theoretical plotted line given by a symbol generator. The method uses a smoothing circuit interposed between the symbol generator and an image memory to carry out a smoothing computation cycle for each point with coordinates X, Y given by the symbol generator. The smoothing circuit uses, during this cycle, at least one matrix of instructed-value coefficients for a group G of N×M points around the point X, Y. These points define a widened, plotted line. The method includes computing (1) real coefficients for each of the N×M points of the widened plotted line as a function of an instructed-value coefficient for this point and (2) a coefficient computed for this point during the previous computation cycle. The previous computation cycle corresponds to a previous point X', Y' of the theoretical plotted line surrounded by a group G' of N×M points partially overlapping the group G. The method according to the invention comprises the following steps for each computation cycle:

determining and storing, in a smoothing circuit, a first set of points of a group G' that do not belong to a second set of points of forming group G;

transmitting, to the image memory, first real coefficients computed for the first set of points during the previous cycle and stored in the smoothing circuit;

computing second real coefficients for the second set of points based on instructed-value coefficients and on the first real coefficients computed for the first set of points of the group G' and stored in the smoothing circuit;

storing, in the image memory, for use in a next computation cycle, the second real coefficients computed for all the points of the group G.

In this method, the determining of the points of the group G' which do not belong to the group G is done by comparison between the coordinates of the current point X, Y and those of the previous point X', Y'. This comparison indicates the direction of shift between the micro-zones G' and G, and hence their overlapping zone and their non-overlapping zone.

After the transmission of the stored coefficients, it is possible to erase the values of coefficients in the non-overlapping zones, and then new coefficients are computed for all the points of the group G as a function of the instructed-value coefficient and a coefficient value computed for the same point of the screen as the previous value and stored in the smoothing circuit.

In short, according to the invention, instead of writing the coefficients of a group G' of N×M points in the image memory after having computed them and making a fresh search in the image memory for certain of these coefficients for a computation of a new group G that has some points in common with the previous group, the only points recorded in the image memory are the definitively processed points which will no longer be needed to establish the continuation of the same plotted line. So long as the points are not definitively processed, the computed coefficients remain stored in the smoothing circuit, preferably in an array of N×M computation and storage cells arranged in a horizontal and vertical shift register working in the forward direction and in the reverse direction.

BRIEF DESCRIPTION OF THE DRAWINGS

Other features and advantages of the invention shall appear from the following detailed description made with reference to the appended drawings, in which:

FIG. 6 is a table that summarizes the operations performed to pass from one point to another of the plotted line.

DETAILED DESCRIPTION OF THE PREFERRED EMBODIMENT

The display of a plotted line using a symbol generator includes producing the points of the successive coordinates of the theoretical plotted line. The generator is an appropriately programmed computer that uses (1) software for the computation of the plotted line and (2) digital data elements on which software programs perform the computations. The digital data elements may come from any source, for example from sensors. For example, if the plotted line is a scrolling scale of the altitude of an aircraft, it will be understood that it is necessary to have at least one altitude sensor. But if the plotted line is a flight program, the data elements are entered at a keyboard or come from another software program. It is assumed, in an aircraft environment, that the symbol generator receives data elements from an on-board computer that itself manages the information elements of sensors distributed in the aircraft.

In practice, the generator gives coordinates of points with a resolution greater than that of the matrix screen. For example, if the screen has rows of 1024 points and columns of 1024 points (encoding on 10 bits), the generator may give coordinates of points on 12 bits (4096 points in rows and the same number in columns).

Initially, it shall be assumed that the X, Y coordinates given by the generator are encoded with the same resolution as the screen. Late, the effect on the invention of an encoding of points that is more precise than the resolution of the matrix screen will be specified.

Conventionally, the symbol generator gives plotted lines without "holes", namely the plotted line uses at least all the points of the screen located on this plotted line. This means that the symbol generator successively gives points whose coordinates are incremented at each time by at most one unit.

There are therefore eight possibilities of going from a point X', Y' to another point X, Y of the theoretical plotted line:
  shifts along the x-axis and y-axis value:
    right-hand: X=X'+1 and Y=Y'
    left-hand: X=X'−1 and Y=Y'
    top: X=X' and Y=Y'+1
    bottom: X=X' and Y=Y'−1
  diagonal shift:
    top right-hand: X=X'+1 and Y=Y'+1
    top left-hand: X=X'−1 and Y=Y'+1
    bottom right-hand: X=X'+1 and Y=Y'−1
    bottom left-hand: X=X'−1 and Y=Y'−1

In a specific plotted line, the symbol generator therefore gives points whose coordinates follow each other in such a way that it is immediately possible, from the coordinates X', Y' and X, Y, to deduce the direction of the shift of the plotted line between these two points from among the eight possible directions. This direction will be used according to the invention to very significantly reduce the frequency of accesses to the image memory.

Figure 1A:
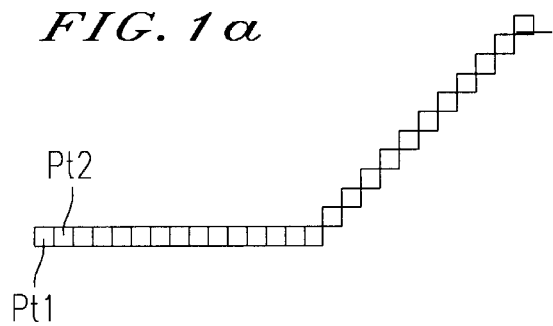
FIG. 1 described above shows a theoretical, single-pixel width plotted line, a plotted line widened by using micro-zones and a plotted line widened and filtered by coefficients of membership in the plotted line.
Figure 1B:
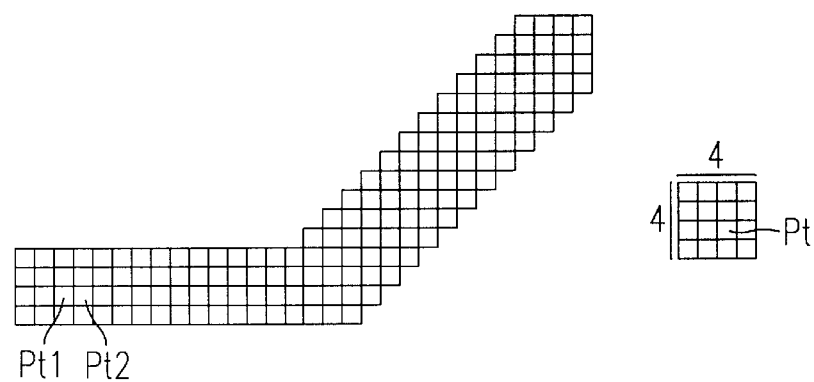
Figure 1C:
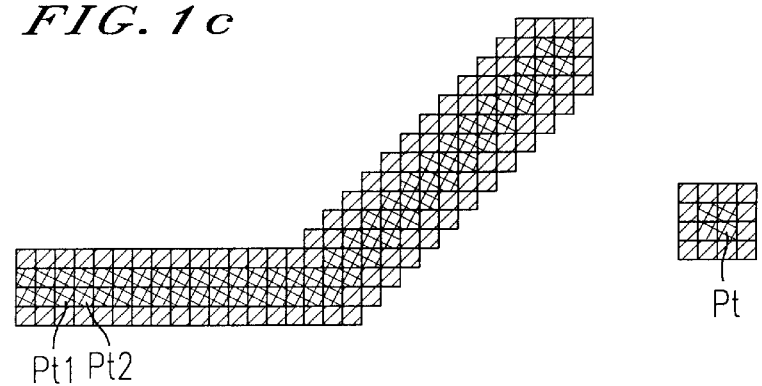
Figure 2:
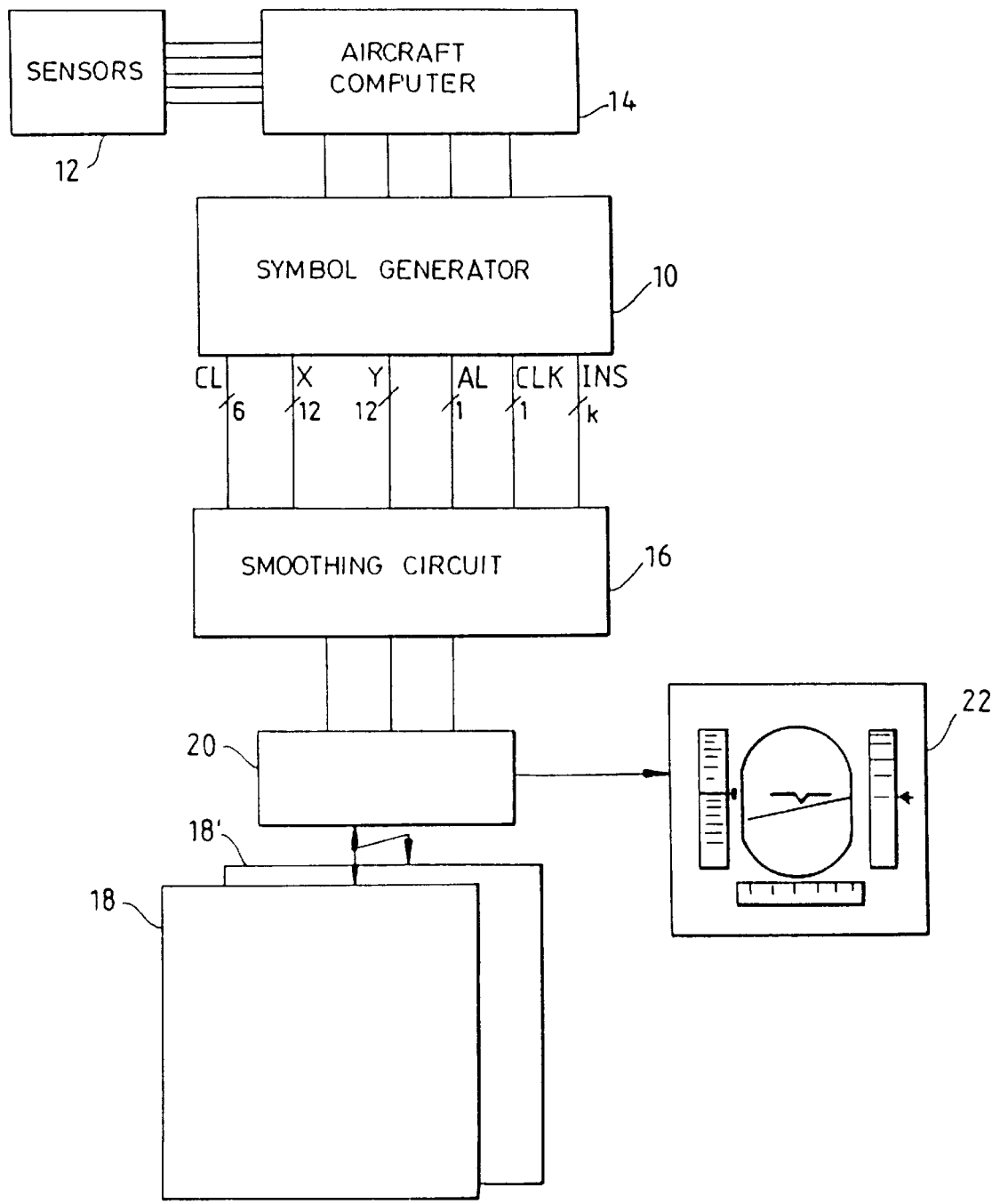
FIG. 2 is a block diagram of a system for the display of smoothed plotted lines.

FIG. 2 shows the general structure of the display system according to the invention. The symbol generator is designated by the reference 10. It receives information elements from sensors 12, possibly using a computer 14, and it gives the coordinates X, Y of the points of a theoretical plotted line to a plotted line smoothing circuit 16. It also gives information on color of a plotted line, for example encoded on 6 bits, and information element for the lighting up or extinguishing of a point of the plotted line (1 bit).

The information on lighting up or extinguishing is not necessary for the explanation of the invention. It results solely from the fact that the symbol generator may give several plotted lines or discontinuous plotted lines so that it is necessary, at certain times, to go from an end point of a first plotted line to a beginning point of another plotted line without showing the plotted line of this shift on the screen. In this case, the lighting-up bit is at zero.

The symbol generator finally provides instructions INS to the smoothing circuit on the type of smoothing to be performed. The smoothing makes use of micro-zone matrices which are tables of coefficients of membership in the plotted line, the tables possibly being different depending on the type of smoothing desired. These instructions are used chiefly to select tables of coefficients or groups of tables of coefficients. The tables are preferably stored in the smoothing circuit 16.

The smoothing circuit 16 replaces each point X, Y of the theoretical plotted line by a micro-zone of N×M points around this point (generally N=M). The microzone comprises a coefficient of membership in the plotted line for each of these N×M points. Real coefficients for each one of these points are defined iteratively, starting from an instructed-value coefficient of a table designated by the symbol generator. It is the smoothing circuit that performs this computation of real coefficients. This is an iterative process since the microzones that replace the points of the theoretical plotted line partially overlap; consequently, a determined point of the smoothed plotted line comes into play several times successively in the computations of coefficients of membership in the smoothed plotted line. It comes into play so long as it forms part of a micro-zone surrounding a part of a theoretical plotted line given by the symbol generator.

The smoothing circuit gives addresses of points of the smoothed plotted line and information elements on luminance and chrominance of the points to a memory image 18 by means of a writing circuit 20. The information elements that are given are results from the computation of the coefficients of membership in the line plotted by the smoothing circuit. The information elements computed may be given in raw form or in encoded form. The display screen 22 periodically receives the totality of the information elements stored in the image memory and displays the general image stored in the memory. Preferably, there are two image memories 18 and 18' working alternately, one being read for the display on the screen while the other receives new information elements and vice versa. The term "coefficient of membership in the plotted line" has been chosen to qualify the digital codes assigned to the points of the micro-zones. This term may cover different practical notions which are mathematically equivalent to a sort of filtering of digital values assigned to the different points of the plotted line widened by the micro-zones.

In the simplest case, the coefficient of membership in the plotted line may be considered to be a coefficient of luminosity of the different points of the widened smoothed plotted line: the symbol generator gives the spinal column of the plotted line, namely a single-pixel wide theoretical plotted line. Starting from this theoretical plotted line, the smoothing circuit sets up a widened plotted line. The width of the widened plotted line is a function of the size N×M of a micro-zone of N points in a row and M points in a column that are substituted for each point of the theoretical plotted line. And the smoothing circuit assigns coefficients of luminosity to each point of the widened plotted line, essentially so that the center of the plotted line is quite luminous and so that the edges are attenuated, thus giving the desired impression of smoothing.

In a more complex situation, the line may be a colored line on a background of another color, and the smoothing may include gradually going from the color of the line to the color of the background without bringing into play mixed colors (which may be very different both from the color of the line and the background color). Again, quite particularly in the case of a color of a line with low contrast as compared with a background color, it is possible to seek to emphasize the contour of the line by a fine border (in principle black). The micro-zones then enable the following assignments:

- to the central position of the line, the highest coefficients of luminosity for the color of the line;
- to the desired position for the border, a zero luminance coefficient; and
- to the exterior of the edge, the coefficients of luminosity increasing towards the exterior but corresponding to the background color.

Thus, a coefficient of luminosity of the points of a line must be considered in practice rather as a coefficient of membership in the plotted line, which is complex because it can bring several colors into play.

For a defined type of smoothing, corresponding to a defined instruction given by the symbol generator, it will be assumed first of all that the micro-zone matrix to be used for the plotted line is fixed. In practice, however, the matrix can vary as a function of the low-order bits of the coordinates X, Y given by the generator when these bits correspond to a resolution higher than that of the screen.

The smoothing circuit works by performing a computation cycle for the computation of the coefficients of membership in the plotted line. The computation cycle being repeated at each new value of a position X, Y given by the symbol generator. Each computation cycle comprises a computation of N×M coefficients of membership corresponding to the micro-zone of N×M points surrounding the point X, Y.

The real coefficient Cpq computed for a determined point with coordinates P, Q of the widened plotted line utilizes:

- the position (i, j) of the point P, Q within the micro-zone centered on the point X, Y of the theoretical plotted line,
- the instructed-value coefficient Ccij defined for the point (i, j) in the chosen instruction-value matrix, and
- the coefficient C'pq computed here above for the same point P, Q of the widened plotted line during the computation cycle performed for the previous point X', Y' of the theoretical plotted line, inasmuch as the point P, Q also belongs to a micro-zone centered on the point X', Y'.

Indeed, assuming that a point P, Q of the widened plotted line has already been assigned a membership coefficient, it is necessary that the subsequent computations should not assign it a constantly decreasing coefficient, solely because as the plotted line progresses, the point gradually comes out of the micro-zones considered in succession.

Consequently, the computation sets up a correlation between the imposed coefficient Ccij for a point P, Q by the instructed-value micro-zone and the previously computed coefficient C'pq for this point. The simplest and most efficient correlation uses, as a new coefficient Cpq for a point P, Q, the highest value SUP(Ccij, C'pq).

According to the invention, during the reception of a point X', Y', the coefficients C'pq are computed by a computation circuit (belonging to the smoothing circuit) for each of the N×M points of a micro-zone G' centered on a point X', Y' and the N×M coefficients C'pq are preserved in the memory in this computation circuit until the reception of a new point X, Y to which there corresponds a new micro-zone G. At the reception of this new point, the points of the microzone G' that do not belong to the new micro-zone G and that therefore do not come into play in the computations of correlation for the micro-zone G are determined. The coefficients stored for these points are sent to the image memory. They are sent because they are definitively processed and it will not be necessary to search for them in the image memory in order to compute new correlations therefrom.

As explained here above, there are only eight possibilities of going from the point X', Y' to the point X, Y. For each possibility there are a certain number of points which are thus definitively processed. Five processing cases are described below, and the remaining three apply similarly to the last.

Rightward shift: the column completely to the left of the micro-zone G' is definitively processed and does not belong to the new micro-zone G. The coefficients of this column are sent to the image memory.

Leftward shift: the right-hand column of the micro-zone G' is definitively processed.

Upward shift: it is the lower row.

Downward shift: it is the upper row.

Top right-hand diagonal shift: the left-hand column and the lower row.

This notion of definitively processed rows entails the assumption, in practice, that the plotted line is not subjected to any turn-back points. This is the general situation and in any case if there were turnback points it could be assumed that there is a succession of two different plotted lines and first of all an end-of-line processing operation would be performed followed by a processing of a new plotted line, with the beginning and ending operations in any case always requiring particular processing operations.

To implement this principle, it will be understood that it is possible to make use of, in the smoothing circuit, (1) a computation circuit and (2) a memory for the storage of the N×M computed coefficients. The N×M computed coefficients would be stored in the memory and then a search would be made each time, by addressing this memory, for the definitively processed coefficients to transmit them to the image memory. A search will also be made for the non-definitively processed coefficients to correlate them with the coefficients of the instructed-value matrix and finally the N×M new coefficients computed will be re-recorded in this memory.

The preferred computation circuit uses a network of N×M computation and storage cells. These cells are organized mutually into a shift register enabling rightward, leftward, top and bottom shifts. The shift register is closed on itself in a ring both in the right-to-left shifting direction and the left-to-right shifting direction as well as in the top-to-bottom and bottom-to-top directions. This means for example that, for a rightward shift, the output of the cell furthest to the right is looped back to the input of the cell furthest to the left.

It shall be seen that this ring-like looping in both directions, both horizontally and vertically, enables the placing, in a cell Cij, of the coefficient computed at the previous cycle in one of the eight neighboring cells for the same point P, Q while the point P, Q is now in a different position in the matrix N×M since the micro-zone shifted between two successive cycles.

Figure 3:
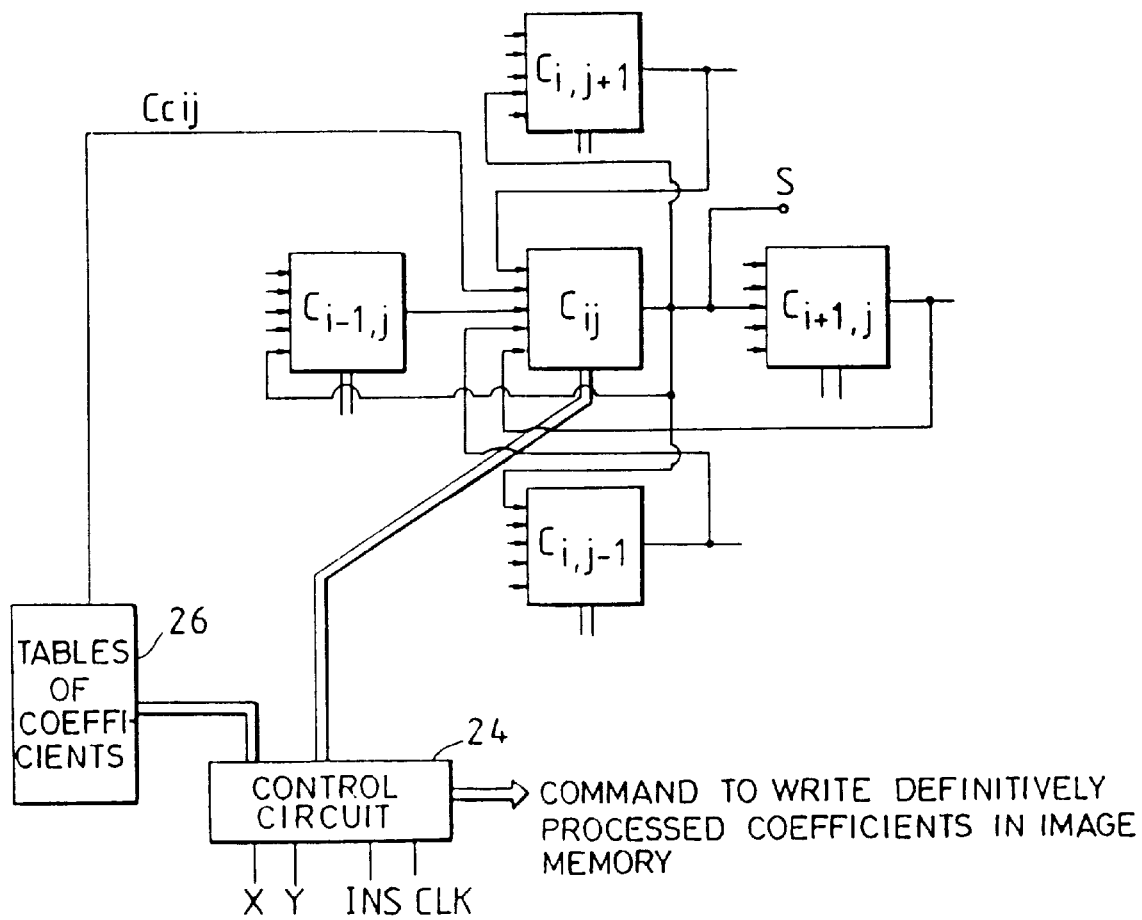
FIG. 3 is an organizational chart of the array of computation and storage cells used in the smoothing circuit.

FIG. 3 shows one organization of the array of cells. The figure shows one computation cell among the N cells in a row and M cells in a column, and its four immediate neighbors. The i, j ranking cell Cij carries out a computation on a determined i, j ranking position in the micro-zone with a dimension N×M.

The computation cells simultaneously perform the coefficient computations for a position X, Y given by the symbol generator and restart a new computation at the following position given by the generator. Whenever there is a computation for the point X, Y, each cell gives a real coefficient Cpq computed for a point with coordinates P, Q on the screen, corresponding to a position i, j in the micro-zone surrounding the point X, Y.

Each cell has an output S and five inputs to receive either an instructed-value coefficient Ccij for the position i, j or a coefficient C'pq previously computed for the same image point P, Q, this being a coefficient that comes from a neighboring cell to the right, the left, the top or the bottom depending on the direction of shift performed to go from the previous point X', Y' to the current point X, Y. The cell Cij has four specific inputs so that it can receive the outputs of four neighboring cells and select one of them.

Only the connections starting from the cell Cij or reaching this cell are shown so as to avoid excessively burdening the figure.

A control circuit 24 is used to control the cells to carry out the shift, computation and storage sequences needed for each computation cycle. This control circuit receives the X, Y coordinates from the symbol generator and it stores the previous coordinates X', Y' for at least the time needed to determine the direction of the vector (X–X', Y–Y'). It also receives the instructions INS from the generator, in particular to select a table of instruction-value coefficients in a table memory 26.

To obtain a configuration of the array of cells in the form of a shift register, the output S of the i, j ranking cell is connected to a specific input of the neighboring cells which are the following cells:

[i+1,j] ranking cell immediately to the right,
[i–1,j] ranking cell immediately to the left,
[i,j+1] ranking cell immediately above,
[i,j–1] ranking cell immediately below.

It may be recalled that the ranks i+1, i–1 must be taken as modulo N values and the ranks j+1, j–1 must be understood as modulo M values since the registers are closed in a ring both horizontally and vertically.

It is the control circuit 24 which, for all the cells at a time, determines the specific input to be used, thus determining a direction of shift for the entire array.

Figure 4:
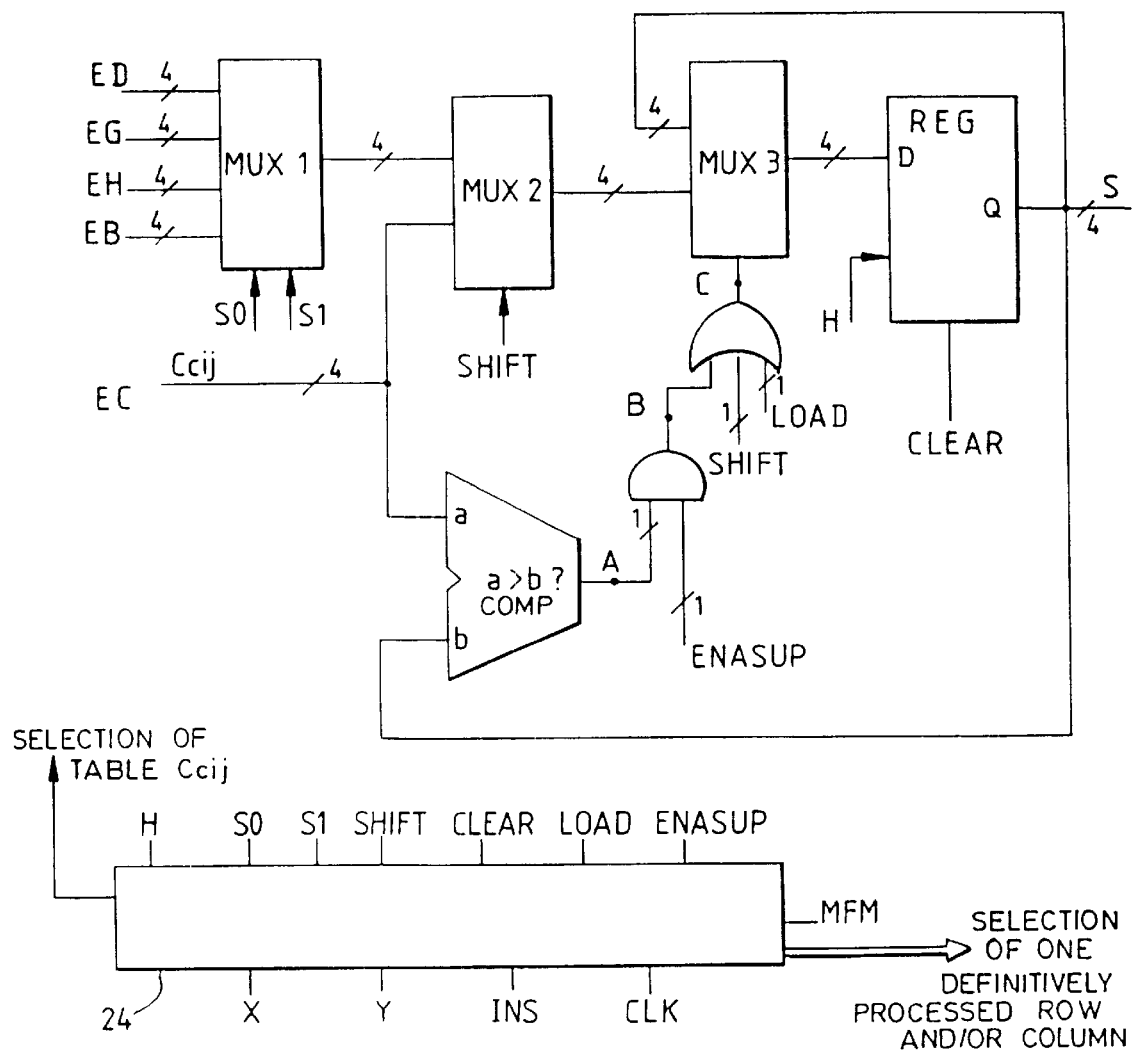
FIG. 4 is an enlarged view of a cell of the array.

FIG. 4 shows the detail of a cell Cij.

The five specific inputs of each cell are the following:
input ED connected to the output of the right-hand cell,
input EG connected to the output of the left-hand cell,
input EH connected to the output of the top cell,
input EB connected to the output of the bottom cell,
input EC to receive a new instructed-value coefficient Ccij coming from a table of coefficients of membership in the plotted line, selected by the smoothing circuit as a function of instructions given by the symbol generator and possibly as a function of the precision bits with coordinates X, Y for the computation in progress.

The connection between cells are shown in the form of single wires; however there are as many wires as there are bits for the encoding of the coefficients, for example, 4 wires.

The selection of the input to be used for the computation at the point X, Y is performed by two multiplexers.

A first multiplexer MUXL selects one of the inputs among the inputs ED, KG, EH, EB and is controlled by logic signals S0, S1 coming from the control circuit 24 common for all the cells.

The pair S0, S1 defines the choice of the one input chosen from among the four, common for all the N×M cells and therefore defines the direction of shift of the entire register constituted by the N×M cells. This direction depends solely on the difference between the coordinates X, Y of the current point and the coordinates X', Y' of the previous point. The control circuit therefore receives the coordinates X, Y and preserves the coordinates of the previous point so as to be able to make a comparison and send out the appropriate signals S0, S1. Since the register cannot make shifts diagonally, and whereas three diagonal shifts might be necessary, it is provided that the shifts will take place in two stages, the first stage (signals S0$a$, S1$a$) being a row or column shift and the second stage (signals S0$b$, S1$b$), used only for the diagonal shifts, being a shift perpendicular to the first one. The control circuit 24 successively gives a pair S0, S1 and then S0$b$, S1$b$, to the inputs S0, S1 successively.

A second multiplexer MUX2 enables the selection of either the output of the first multiplexer or the input EC coming from a table of coefficients. The multiplexer MUX2 is controlled by a command SHIFT which, if active, selects the output of the first multiplexer and if it is inactive, selects the input EC. There are two successive active SHIFT commands if a diagonal shift has to be performed.

A third multiplexer MUX3 enables the loading into a memory flip-flop circuit REG of either the value previously contained in this flip-flop circuit (looping of the output of the flip-flop circuit to its input) or a new value coming from the output of the second multiplexer MUX2. The flip-flop circuit is a D-type flip-flop circuit which locks its input during a clock pulse H, includes as many binary flip-flop circuits as there are bits for the encoding of the computed coefficients.

Finally, a correlation is performed between the coefficient C'pq previously computed for a given point P, Q present at the output of the flip-flop circuit REG after the appropriate shifts, and the new instructed value Ccij proposed by the table at the input EC. The correlation planned here is very simple. It is the higher value of the two values that is adopted. A real coefficient Cpq=SUP(Ccij, C'pq) is obtained. This is obtained by means of a comparator COMP that receives an instruction coefficient Ccij at one input, coming from the input EC and, at another input, receives the previously computed value C'pq, coming from the output of the flip-flop circuit. One of the inputs of the comparator is therefore connected to the input EC and the output is connected to the output S of flip-flop circuit.

The output of the comparator is a bit indicating the highest value. A computation phase (for computing the higher value) occurs based on an authorization signal ENASUP, and includes activating the third multiplexer MUX3 to (1) reposition the value C'pq that it contained previously (if it is the highest value) in the flip-flop circuit or (2) replace it by a new coefficient Ccij coming from the input EC (if it is this new coefficient that is the highest value).

An AND gate controlled by the signal ENASUP passes the output of the comparator to the command of the multiplexer MUX3 by means of an OR gate. The OR gate gives a signal to command the switch-over of the multiplexer MUX3:

either coming from the SHIFT command if it is necessary to carry out a recording, in the register, of a set of contents coming from a neighboring cell, at a first computation step;

or coming from the comparator COMP if a new coefficient has to be recorded in the register, in a second computation step;

or again coming from an initial loading command LOAD, when starting to plot a line by writing new coefficients in the register without correlation with former values. The command LOAD is optional.

The flip-flop circuit REG comprises a clearing command CLEAR, i.e., a command to reset the membership coefficient obtained at an output. This command is controlled by the control circuit 24 either for an individual cell or for a row or a column of cells, and in practice above for the first row, the last row, the first column and the last column of the array of NXM cells. The command CLEAR may also be assigned to all the cells at a time, especially if there is no command LOAD.

Finally, the outputs of the registers of certain cells (those which are on the edges of the array) may be sent to the image memory. The control circuit 24 is organized to send, to the image memory, by means of the command MEM, the output values of the flip-flop circuits REG from:

the first row, or the last row, or the first column, or the last column, or the first row and the first column, or the first row and the last column, or the last row and the first column, or the last row and the last column as a function of the vector (X–X', Y–Y') that defines the specific row and/or column of definitively/completely processed points.

Figure 5:
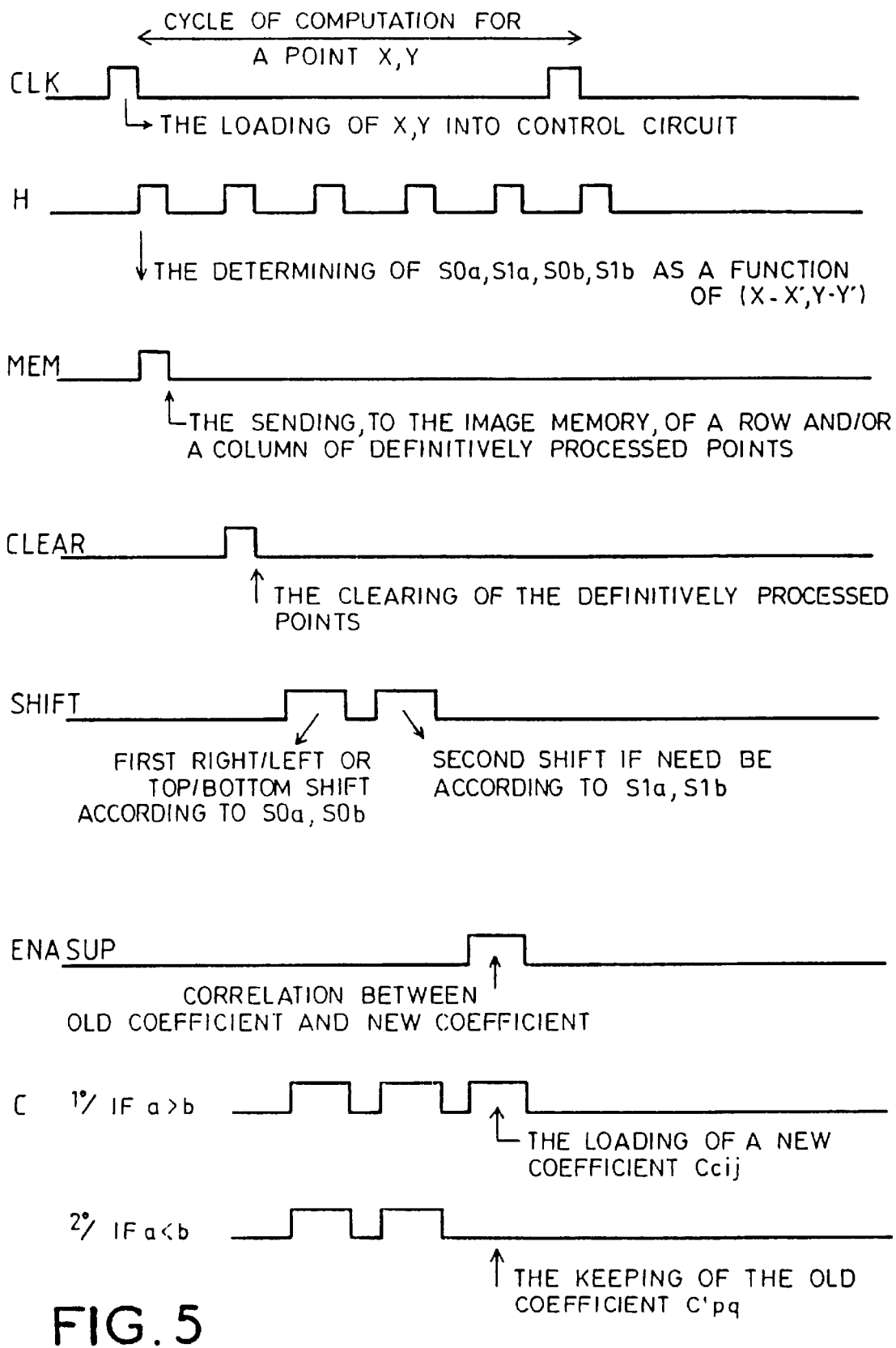
FIG. 5 is a timing diagram explaining the working of the array of cells.

The working of the smoothing circuit comprises the following steps, shown in the timing diagram of FIG. 5. This figure refers to the control signals mentioned with reference to FIG. 4 and to the logic signal on the command C of the multiplexer MUX3. It is assumed that a plotted line given by the symbol generator is in progress, that the computations are performed from the reception of the coordinates X, Y of a current point of the plotted line and that been a point immediately before X', Y' was generated for the same plotted line. The current point is shifted from the previous point by one and only one box, row-wise, column-wise or diagonally.

First Computation Step:

The control circuit 24 receives a new point X, Y;

The control circuit determines the direction of shift on the basis of the vector difference (X–X', Y–Y') and produces two pairs of controlled signals (S0*a*, S1*a*) and (S0*b*, S1*b*) to be used successively; only one pair S0*a*, S1*a* is used if the shift is not diagonal;

The coefficients C'pq are transmitted to the image memory, by a command MEM of the control circuit 24, where coefficients C'pq are computed at the previous cycle for the definitively processed row and/or column, defined as a function of the detected direction of shift;

The corresponding flip-flop circuits are cleared by the command CLEAR assigned to the corresponding row and/or column, after their contents have been transferred.

Second Computation Step:

The first shift (by an active command SHIFT), is performed using the direction of the shift defined by the signals S0a and SI a from the control circuit; the outputs of the flip-flop registers are reloaded.

Third Computation Step:

A second shift is performed (by an active command SHIFT), but only if a diagonal shift has been made between the point X', Y' and the point X, Y. The direction of the second shift is defined by the signals S0*b*, S1*b*.

At this stage, the output value taken for an i, j ranking cell that corresponds to a point with coordinates P, Q of the screen corresponds to the value of coefficient of membership C'pq that had been computed at the previous cycle for the same point P, Q since the shift of the contents of the cells by the commands SHIFT compensates for the shift of the entire micro-zone due to the shift (X–X', Y–Y').

It will be noted that writing to the image memory and clearing or erasing may be performed after the shift operations, naturally by modifying the row or column numbers to be written and cleared.

Fourth Computation Step:

Enabling activated correlation ENASUP. The flip-flop circuit REG is loaded at the highest value between the new coefficient present at the input EC and the coefficient currently present at the output of the register.

The computation circuit is ready for a new cycle and remains waiting for new single-pixel width plotted line coordinates.

After plotting a line, it may be necessary to unload the entire micro-zone into the image memory; this can be done by successively shifting and transmitting one row at a time. The command ENASUP will not be activated after clearing after plotting a line.

Special processing operations may be performed when two plotted lines intersect to prevent mixtures of color of two plotted lines.

Thus, the essential features of the-structure of the display system and its method of operation have been described.

Moreover, the system works even if the generator gives points X, Y with a resolution higher than that of the screen. It may be assumed for example that X, Y are encoded on 12 bits and that the 10 higher-order bits of X and Y correspond to the resolution of the screen. The two low-order bits are precision bits within the screen matrix.

If the 10 higher-order bits of the new point X, Y are different from the 10 higher-order bits of the previous point X, Y the previous case is revisited. That is, registers are shifted as a function of the changing of the point of the screen that results therefrom. But, in addition, the low-order bits of X and Y are used to select a determined micro-zone from a group of possible microzones. Indeed, it may be useful to vary the composition of the matrix of coefficients according to the exact position of the point of the theoretical plotted line in 12-bit resolution. The control circuit 24 then selects a group of tables of coefficients as a function of the instructions INS given by the symbol generator. For example, to define a particular type of smoothing, one table is selected from this group as a function of the precision bits of X, Y.

If at this stage the passage from the point X', Y' to the point X, Y does not imply any change in a screen point, there is no shift to be made in the array of cells. The command SHIFT must remain inactive. But this does not prevent the activation of the command ENASUP which will perform the function of correlation (SUP) between the coefficients already stored resulting from the previous computation and the instructed-value coefficients given by the instructed-value table. Here again, the instructed-value may depend on the precision bits of X, Y.

The table of FIG. 6 summarizes the shift instructions given as a function of the change (on 10 bits) of X', Y' to X, Y.

The invention can be used to reduce the number of accesses to the image memory. It is possible to further reduce the number, if necessary, by using memories with several parallel access ports that allow several words at a time to be written to different addresses.

What is claimed is:

1. A display system comprising:

a symbol generator;

a plotted line smoothing circuit; and an image memory, wherein the symbol generator provides coordinates of successive points of a plotted line of a symbol to be displayed, wherein the smoothing circuit computes coefficients of membership in the plotted line for a group G of N×M points surrounding a point with coordinates X, Y after having computed the coefficients of membership in the plotted line for another group G' of N×M points surrounding a point with coordinates X', Y' previously given by the symbol generator, the smoothing circuit comprising:

writing means for sending, to the image memory, the coefficients of membership in the plotted line solely for non-overlapping points of group G' that do not belong to the group G, said non-overlapping points being determined as a function of a shift vector (X–X', Y–Y') connecting point X', Y' to point X, Y, means to compute new coefficients of membership of points of group G, taking account of coefficients previously computed for points common to the groups G and G', and means for preserving, in N×M storage cells outside said image memory, for use in a subsequent computation, said new coefficients of membership computed for the points of the group G.

2. A system according to claim 1, wherein the smoothing circuit comprises an array of N×M computation and storage cells connected to one another to form a right/left, left/right, top/bottom and bottom/top shift register and a control circuit capable of defining shifts to be performed simultaneously for all said cells.

3. A system according to claim 2, wherein the shift register comprises connections forming a ring, both horizontally and vertically, wherein (1) outputs of cells at a far left end of the array are connected to inputs of cells at a far right end of the array and vice versa, and (2) cells of a bottom end of the array are connected to cells of a top end of the array and vice versa.

4. A system according to any one of claims 2 and 3, wherein the control circuit receives, from the symbol generator, the coordinates X, Y of a point of the plotted line and stores the coordinates of the previous point to set up shift signals as a function of the shift vector.

5. A system according to any one of claims 2 and 3, wherein the control circuit controls transmitting, to the image memory, the coefficients computed by the cells of at least one of an end row and an end column of the array, as a function of the shift vector.

6. A system according to claim 5, wherein the control circuit erases a contents of the cells of the at least one of the end row and the end column that are transmitted to the image memory.

7. A system according to any one of claims 2 to 3, wherein each cell comprises multiplexing means to receive either a coefficient coming from a table selected by the control circuit or the output of a neighboring cell selected by the control circuit.

8. A system according to claim 7, wherein the control circuit provides (1) control signals for shifting contents of cells to neighboring cells for storage, and (2) a signal to permit comparison between a coefficient contained in a cell and a coefficient given by a table.

9. A method for processing plotted lines to be displayed on a display screen based on a theoretical plotted line given by a symbol generator, the method using a smoothing circuit interposed between the symbol generator and an image memory to carry out a smoothing computation cycle for each point with coordinates X, Y given by the symbol generator, and the smoothing circuit using, during the computation cycle, at least one matrix of original coefficients for a group G of N×M points around point X, Y, the N×M points defining a widened plotted line, the method including computing modified coefficients for each of said N×M points of the widened plotted line as a function of an original coefficient for said each of said N×M points and of a coefficient computed for said each of said N×M points during a previous computation cycle corresponding to a previous point X', Y' of the theoretical plotted line surrounded by a group G' of N×M points partially overlapping the group G, said method comprising the following steps for each computation cycle:

determining, in the smoothing circuit, non-overlapping points of the group G' that do not belong to the group G, said non-overlapping points being determined as a function of a shift vector (X–X', Y–Y') connecting point X', Y' to point X, Y;

transmitting, to the image memory, modified coefficients computed for said non-overlapping points during the previous cycle and stored in the smoothing circuit;

computing new modified coefficients for points of group G based on the original coefficients and the modified coefficients previously computed for points of the group G' and stored in N×M cells in the smoothing circuit outside said image memory;

storing in the N×M cells outside said image memory, for use in a subsequent computation cycle, said new modified coefficients computed for all points of group G'.

10. A method according to claim 9, wherein the determining step determines the non-overlapping points of group G' which do not belong to group G by comparing (a) the coordinates of point X, Y and (b) said previous point X', Y'.

* * * * *